United States Patent
Drochon et al.

(10) Patent No.: US 7,470,322 B2
(45) Date of Patent: Dec. 30, 2008

(54) CEMENTING COMPOSITION WITH CONTROLLED MECHANICAL PROPERTIES

(75) Inventors: Bruno Drochon, Noisy le Grand (FR); Simon James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 218 days.

(21) Appl. No.: 10/595,359

(22) PCT Filed: Sep. 27, 2004

(86) PCT No.: PCT/EP2004/010848

§ 371 (c)(1), (2), (4) Date: Apr. 12, 2006

(87) PCT Pub. No.: WO2005/040549

PCT Pub. Date: May 6, 2005

(65) Prior Publication Data

US 2007/0022915 A1 Feb. 1, 2007

(30) Foreign Application Priority Data

Oct. 20, 2003 (GB) .................................. 0324427.4

(51) Int. Cl.
    *C04B 14/00* (2006.01)
(52) U.S. Cl. .................. 106/789; 106/713; 106/724
(58) Field of Classification Search .............. 106/724, 106/713, 789
    See application file for complete search history.

(56) References Cited

U.S. PATENT DOCUMENTS

| 4,353,748 | A | * | 10/1982 | Birchall et al. | |
|---|---|---|---|---|---|
| 5,518,996 | A | * | 5/1996 | Maroy et al. | 507/100 |
| 6,153,562 | A | * | 11/2000 | Villar et al. | 507/269 |
| 6,312,515 | B1 | * | 11/2001 | Barlet-Gouedard et al. | 106/709 |
| 6,508,305 | B1 | * | 1/2003 | Brannon et al. | 166/293 |
| 6,626,991 | B1 | * | 9/2003 | Drochon et al. | 106/672 |
| 6,645,288 | B1 | * | 11/2003 | Dargaud et al. | 106/696 |
| 6,742,592 | B1 | * | 6/2004 | Le Roy Delage et al. | 166/293 |
| 6,902,001 | B2 | * | 6/2005 | Dargaud et al. | 166/293 |
| 6,953,091 | B2 | * | 11/2005 | Volpert | 166/293 |
| 7,229,492 | B2 | * | 6/2007 | Chatterji et al. | 106/724 |
| 2003/0116064 | A1 | | 6/2003 | Danican et al. | |
| 2005/0061206 | A1 | * | 3/2005 | Reddy et al. | 106/672 |

FOREIGN PATENT DOCUMENTS

| EP | 0621247 | 10/1994 |
|---|---|---|
| GB | 2385325 | 8/2003 |
| GB | 2399083 | 9/2004 |
| WO | WO0037387 | 6/2000 |

\* cited by examiner

*Primary Examiner*—Paul Marcantoni
(74) *Attorney, Agent, or Firm*—David Cate; Robin Nava; Dale Gaudier

(57) ABSTRACT

A cement composition for which the mechanical properties of the set cement can be controlled independently of the slurry density, both at high density (>16 ppg) and at low density (<12 ppg) comprises a trimodal blend of particulate materials present as fine, medium and coarse particule size fractions, the particulate materials including cement, flexible particles, and a filler, characterized in that the cement comprises the fine particle size fraction, and the flexible particles and filler comprise the medium and large particle size fractions.

23 Claims, No Drawings

CEMENTING COMPOSITION WITH CONTROLLED MECHANICAL PROPERTIES

The present invention relates to cementing compositions for drilling oil, gas, water, geothermal, or analogous wells. More precisely, the invention relates to cementing compositions that are suitable for cementing zones of such wells that are subjected to extreme stresses.

In general, a well which is more than a few hundreds of meters deep is cased, and the annular space between the underground formation and the casing is cemented over all or part of its depth. The essential function of cementing is to prevent fluid exchange between the different formation layers through which the hole passes and to control the entry of fluid into the well, in particular to limit the entry of water. In production zones, the casing, the cement and the formation are all perforated, typically by the use of explosive perforating charges, over a few meters.

The cement positioned in the annular space in an oil well is subjected to a number of stresses throughout the lifetime of the well. The pressure inside the casing can increase or decrease as the fluid filling it changes or as additional pressure is applied to the well, such as when the drilling fluid is replaced by a completion fluid or by a fluid used in a stimulation operation. A change of temperature also creates stress in the cement, at least during the transition period before the temperatures of the steel and the cement come into equilibrium. In the majority of the above cases, the stressing process is sufficiently slow to enable it to be treated as a static process.

However, the cement is subjected to other stresses which are dynamic in nature either because they occur over a very short period, or because they are either periodical or repetitive to a greater or lesser extent. Perforating does not just cause an over-pressure of a few hundred bars inside the well, it also dissipates in the form of a shock wave. In addition, perforating creates a shock when the charge penetrates the cement and that shock subjects the zone surrounding the hole to large forces extending over a length of a few meters.

Another process that creates dynamic stresses in the cement and which is now very common in oilwell operations is when a window is cut in a cemented casing to create a sidetrack. Milling the steel over a depth of several meters followed by drilling a sidetrack subjects the cement to shock and to vibration, which often damage it irreversibly.

In an article presented at the SPE (Society of Petroleum Engineers) annual conference and exhibition 1997 (SPE 38598, 5-8 Oct. 1997) and in French patent application FR 97 11821, 23 Sep. 1997) Marc Thiercelin et al. have shown that the risk of rupture of a cement sheath depends on the thermoelastic properties of the casing, of the cement, and of the formation which surrounds the well. A detailed analysis of the mechanisms leading to rupture of the cement sheath has shown that the risk of rupture of a cement sheath following an increase in pressure and/or temperature in the well is directly linked to the Young's modulus of the cement and is attenuated when the ratio (R) of the tensile strength TS of the cement over its Young's modulus E is increased.

Young's modulus is known to characterize the flexibility of a material. Thus to increase the ratio R=Tensile strength/Young's modulus, materials should be selected that have a low Young's modulus, in other words materials that are highly flexible.

One known way of increasing the flexibility of hardened cement is to reduce the density of a cement slurry by watering it down. However, this method is restricted to a density range of between 12 and 16 ppg.

WO 00/20350, WO 00/37387 and WO 01/25163 all disclose the use of flexible particles incorporated in cement to provide a degree of flexibility in the cement and some protection against the detrimental effects of induced stresses in the cement. WO 00/20350 discloses cement compositions that use rubber particles to provide flexibility. WO 00/37387 proposes the use of flexible particles having grain sizes of less than 500 µm, Young's modulus of less than 5000 MPa and densities of less than 1.5 g/cm$^3$. Suitable materials in this role are thermoplastics, especially polyamides, polypropylene, polyethylene, etc., and polymers such as styrene divinyl benzene or styrene butadiene rubber (SBR). WO 01/25163 discloses the use of flexible particles with low compressibility together with dense material (hematite) to provide heavier flexible cements. The use of phenol-formaldehyde resins to modify cement mechanical properties is disclosed in UK Patent Application No. 0203505.3.

The Young's Modulus of a cementitious material is dependent on several parameters:
- the slurry porosity (defined as the volume of water divided by the volume of slurry)
- the nature and concentration of the fillers which can be blended with the cement
- the foam quality in foamed cement (defined as the volume of gas divided by the volume of the foamed slurry)

When considering conventional foamed cement or lightweight (extended) systems, the Young's Modulus of the set material is directly linked to the foam quality, i.e. gas content, (for foamed systems) or the slurry porosity, i.e. water content, (for extended systems). Therefore, there is no way to adjust the mechanical properties independently of the slurry density.

The technology described in WO 00/20350, WO 00/37387 and WO 01/25163 provides a significant improvement by using flexible fillers in a high solid content system (such as is described in EP 0 621 247). The slurries typically have densities between about 12 ppg and about 16 ppg. The mechanical properties are adjusted independently of density by adding more or less flexible particles in the blend. This technology is limited in its density range as the flexible particles have a much lower specific gravity compared to cement. Therefore, it is not possible to design high-density slurries (>16 ppg) with a high amount of such flexible particles. At low density (<12 ppg) insufficient flexible particles can be added to lower the density further without copromising the compressive strength of the cement.

This invention provides cement compositions for which the mechanical properties of the set cement can be controlled independently of the slurry density, both at high density (>16 ppg) and at low density (<12 ppg).

In accordance with the present invention, there is provided a well cementing composition comprising a trimodal blend of particulate materials present as fine, medium and coarse particle size fractions, the particulate materials including cement, flexible particles, and a filler, characterized in that the cement comprises the fine particle size fraction, and the flexible particles and filler comprise the medium and large particle size fractions.

The cement forming the fine particle size fraction is preferably micro-cement or a mixture of micro-cement and slag, and has a mean particle size of 10 microns or less.

The use of a fine cement allows a lower concentration of cement to be used in the blend of particulate materials while leaving more "room" for flexible additives or weighting agents (to control the density of the mixture) or a combination of the two. Preferably, the amount of cement in the composition is less than 30% by volume of blend (BVOB). It is particularly preferred that the amount of cement is less than 25% BVOB, and according to the desired properties of the cement (in particular the compressive strength), may be less than 20% BVOB, or 15% BVOB and may even be as low as 10% BVOB.

For example a conventional design for a 17 ppg system with a solid volume fraction (SVF) of 60%, i.e. porosity of 40%, might contain 10% fine silica (fine), 35% Class G (medium), 20% Hematite (large) and 35% flexible particle (large) (all % BVOB). A composition according to an embodiment of the invention (at 60% SVF) might contain 22% microcement (fine), 5% fine silica (fine), 31% Hematite (medium) and 42% flexible particle (large) (all % BVOB). This latter system has more flexible particles and thus the set cement will have a lower Young's modulus. Also the medium sized hematite is easier to stabilize in the blend and in a slurry with water than large hematite.

The preferred average particle sizes in the different particle size bands are as follows: fine—less than 10 microns; medium—20 to 100 microns; large—100 to 400 microns. The particulate materials are selected to provide a blend that has an optimized packing volume fraction (PVF), typically above 0.78. Such blends can comprise:

- Microcement (or blend of microcement/micro-slag) as fines particles;
- Medium and coarse particles selected from heavy fillers (such as hematite, ilmenite, . . . ) and flexible particles (such as ground rubbers, polyethylene, styrene-divinyl-benzene, . . . ) for high density systems (above 16 ppg);
- For low density systems (below 12 ppg), medium and coarse particles selected from lightweight fillers hollow glass beads, hollow aluminosilicate particles) and flexible particles.

The present invention will now be described by way of non-limiting examples.

Cement compositions according to this invention demonstrate that using microcement as fine particles and as the only cementitious component, allows a good compressive strength to be obtained for the set cement even when the micro-cement is used at levels as low as 10% by volume of blend.

To provide high density slurries, weighting agents have to be added in a significant amount to the blend. For a conventional system (Portland cement+weighting agent), the amount of weighting agent that can be used is quite limited due to high viscosity and slurry stability problems. Using an optimized PVF, the rheology can be maintained at an acceptable level and the amount of weighting agent significantly increasing leading to pumpable slurries up to 24 ppg. These types of slurries have a very high compressive strength but also have a high Young's Modulus.

For conventional lightweight slurries water can be added but eventually the permeability of the set cement becomes too high and the compressive strength too low.

The present invention provides the ability to adjust the Young's Modulus independently of the slurry density for slurries above 16 ppg and for slurries below 12 ppg. The concept is to use a blend of particles selected in a way such the PVF is optimized (typically above 0.78) with the cement being present in the fine particle size band only. This approach allows cement slurries to be designed with a given density, and which lead to set materials having from very low (1000 MPa) to medium (4000 MPa) Young Modulus.

EXAMPLE 1

| Very low Young's modulus | |
|---|---|
| Fine Particle Fraction: | |
| Micro-cement 3.5 micron | 12% BVOB |
| Manganese tetroxide 1.7 micron | 10% BVOB |
| Medium Particle Fraction | |
| Hematite 70 micron | 25% BVOB |
| Large Particle Fraction | |
| Hematite 250 micron | 15% BVOB |
| Rubber Particles 400 micron | 38% BVOB |
| Density | 19.10 ppg |
| Porosity | 40% |
| Compressive Strength | 972 MPa |
| Young's Modulus | 1609 |

EXAMPLE 2

| Low Young's Modulus | |
|---|---|
| Fine Particle Fraction: | |
| Micro-cement 3.5 micron | 19% BVOB |
| Manganese tetroxide 1.7 micron | 10% BVOB |
| Medium Particle Fraction | |
| Hematite 70 micron | 21% BVOB |
| Large Particle Fraction | |
| Silica 300 micron | 35% BVOB |
| Rubber particles 400 micron | 15% BVOB |
| Density | 19.13 ppg |
| Porosity | 40% |
| Compressive Strength | 2565 MPa |
| Young's Modulus | 4246 |

EXAMPLE 3

| Medium Young's Modulus | |
|---|---|
| Fine Particle Fraction | |
| Micro-cement 3.5 micron | 18% BVOB |
| Silica 3 micron | 10% BVOB |
| Medium Particle Fraction | |
| Hematite 70 micron | 20% BVOB |
| Large Particle Fraction | |
| Silica 300 micron | 52% BVOB |
| Density | 19.01 ppg |
| Porosity | 40% |
| Compressive Strength | 4253 MPa |
| Young's Modulus | 7040 |

EXAMPLE 4

| Conventional Optimised System (comparative example) | | |
|---|---|---|
| Fine Particle Fraction | | |
| Manganese tetroxide 1.7 micron | 14% | BVOB |
| Medium Particle Fraction | | |
| Class G Cement 20-50 micron | 36% | BVOB |
| Large Particle Fraction | | |
| Silica 300 micron | 50% | BVOB |
| Density | 19.04 | ppg |
| Porosity | 40% | |
| Compressive Strength | 6883 | MPa |
| Young's Modulus | 11392 | |

Note the very high Young's modulus

EXAMPLE 5

| Fine Particle Fraction | | |
|---|---|---|
| Micro-cement 3.5 micron | 13% | |
| Medium Particle Fraction | | |
| Hematite 70 micron | 35% | BVOB |
| Large Particle Fraction | | |
| Hematite 250 micron | 20% | BVOB |
| Rubber particles 400 micron | 32% | BVOB |
| Density | 20.52 | ppg |
| Porosity | 40% | |
| Compressive Strength | 1229 | MPa |
| Young's Modulus | 2034 | |

EXAMPLE 6

| Fine Particle Fraction: | | |
|---|---|---|
| Micro-cement 3.5 micron | 10% | BVOB |
| Manganese tetroxide 1.7 micron | 15% | BVOB |
| Medium Particle Fraction | | |
| Hematite 70 micron | 20% | BVOB |
| Large Particle Fraction | | |
| Hematite 250 micron | 35% | BVOB |
| Rubber particles 400 micron | 20% | BVOB |
| Density | 22.99 | ppg |
| Porosity | 40% | |
| Compressive Strength | 1751 | MPa |
| Young's Modulus | 2898 | |

The water used to constitute the slurries is preferably low mineral content water such as tap water. Other water, such as sea water, can also be used.

The compositions of the invention can also comprise additives that are routinely used in the majority of cementing compositions, for example dispersing agents, antifoam agents, suspension agents, cement retarders or accelerating agents, and fluid loss control agents.

EXAMPLE 7

A 17 ppg system is designed according to the present invention. The slurry design is given in the table below. The slurry is mixed following API procedures, placed in moulds and then cured in water for 7 days at 150° C. and 20.7 MPa. Following the curing period the cement is cooled to room temperature and cut into cylinders 2 inches long and 1 inch in diameter with parallel end faces. The Young's modulus of the sample is then measured using conventional techniques (see for example Handbook on Mechanical Properties of Rocks (Vol. 1-4, V. S. Vutukuri, R. D. Lama and S. S. Saluja, Transtech Publishing, 1974). The Young's modulus of the system is 800 MPa This is an order of magnitude lower than the Young's modulus of a conventional 15.8 ppg class G and silica system cured and tested under the same conditions.

| | Design example 7 | % BVOB |
|---|---|---|
| Micro-cement (fine) 3.5 micron | 145.3 g/600 ml | 14 |
| Hematite (medium) 70 micron | 661.66 g/600 ml | 38 |
| Synthetic rubber particle (coarse) 400 micron | 175.6 g/600 ml | 48 |
| Antifoam agent | 2.45 g/600 ml | |
| Dispersant | 3.05 g/600 ml | |
| Polymeric fluid loss additive | 2.95 g/600 ml | |
| Porosity | 41% | |
| Density | 17.03 lb/gal | |

EXAMPLE 8

A 9.7 ppg system is designed according to the present invention. The slurry design is given in the table below. The slurry is mixed following API procedures, de-gassed under vacuum, placed in moulds and then cured in water for 7 days at 77° C. in a water bath at ambient pressure. Following the curing period the cement is cooled to room temperature and cut into cylinders 2 inches long and 1 inch in diameter with parallel end faces. The Young's modulus of the sample is measured using conventional techniques (see for example Handbook on Mechanical Properties of Rocks (Vol. 1-4, V. S. Vutukuri, R. D. Lama and S. S. Saluja, Transtech Publishing, 1974). The Young's modulus of the system is 230 MPa. This is even lower than the Young's modulus of example 7 due to the presence of additional flexible particles rather than a medium sized mineral filler.

| | Design example 8 | % BVOB |
|---|---|---|
| Micro-cement (fine) 3.5 micron | 146.0 g/600 ml | 15 |
| Synthetic rubber (medium) 48 micron | 99 g/600 ml | 30 |
| Synthetic rubber (coarse) 400 micron | 181.5 g/600 ml | 55 |
| Antifoam agent | 1.06 g/600 ml | |
| Dispersant | 1.03 g/600 ml | |
| Porosity | 45% | |
| Density | 9.7 lb/gal | |

It will be appreciated that these examples are illustrative only. Changes can be made while still remaining within the scope of the invention.

The invention claimed is:

1. A well cementing composition comprising a trimodal blend of particulate materials present as fine particles having an average particle size of 10 microns or less, medium particles having an average particle size of 20 to 100 microns and coarse particles having an average particle size of 100 to 400 microns, the particulate materials including cement, flexible particles, and a filler, the cement comprising only the fine particle size fraction, and the flexible particles and filler comprising the medium and coarse particle size fractions, allowing a control of the mechanical properties of the set cement independently of the density of the cementing composition slurry, wherein the blend has a packing volume fraction of at least 0.78, and wherein the cement comprises micro-cement or a mixture of micro-cement and slag.

2. The composition as claimed in claim 1, wherein the medium and large particle size fractions comprise high-density fillers and flexible particles.

3. The composition as claimed in claim 2, wherein the high-density fillers comprise hematite or ilmenite.

4. The composition as claimed in claim 2 when mixed with water forms a slurry having a density above 1.92 g/cm$^3$ (16 ppg).

5. The composition as claimed in claim 1, wherein the medium and large particle size fractions comprise low-density fillers and flexible particles.

6. The composition as claimed in claim 5, wherein the low-density fillers comprise hollow glass beads, hollow aluminosilicate particles, microspheres, cenospheres, or hollow ceramic beads.

7. The composition as claimed in claim 5 when mixed with water forms a slurry having a density below 1.44 g/cm3 (12 ppg).

8. The composition as claimed in claim 2, wherein the flexible particle comprise ground rubbers, polyethylene, polypropylene or styrene-divinylbenzene.

9. The composition as claimed in claim 1, comprising:
10-30% BVOB fine particles;
20-40% BVOB medium particles; and
40-55% BVOB coarse particles.

10. The composition as claimed in claim 9, wherein the fine particles contain 10-25% BVOB cement.

11. The composition as claimed in claim 9, wherein the fine particles contain 10-15% manganese tetroxide.

12. The composition as claimed in claim 9, wherein the fine particles contain up to 10% BVOB silica.

13. The composition as claimed in claim 9, wherein the medium particles comprise hematite.

14. The composition as claimed in claim 9, wherein the medium particles contain rubber, synthetic rubber, polypropylene or silica.

15. The composition as claimed in claim 9, wherein the coarse particles contain up to 35% BVOB hematite.

16. The composition as claimed in claim 9, wherein the coarse particles contain 15-40% BVOB rubber.

17. The composition as claimed in claim 9, wherein the coarse particles contain 35-52% BVOB silica.

18. The composition as claimed in claim 9, wherein the coarse particles contain about 55% BVOB rubber, synthetic rubber, or polypropylene.

19. The composition as claimed in claim 1, wherein the cement content of the blend is less than 30% BVOB.

20. The composition as claimed in claim 19, wherein the cement content is less than 25% BVOB.

21. The composition as claimed in claim 20, wherein the cement content is less than 20% BVOB.

22. The composition as claimed in claim 21, wherein the cement content is less than 15% BVOB.

23. The composition as claimed in claim 1, wherein the mechanical properties comprise the Young's Modulus.

* * * * *